United States Patent
Jeong et al.

(10) Patent No.: US 12,381,202 B2
(45) Date of Patent: *Aug. 5, 2025

(54) ANODE FOR LITHIUM SECONDARY BATTERY, METHOD OF MANUFACTURING THE SAME AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: Kwang Ho Jeong, Daejeon (KR); Seung Deok Seo, Daejeon (KR); Ji Sun Lee, Daejeon (KR)

(73) Assignees: SK ON CO., LTD., Seoul (KR); SK INNOVATION CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,787

(22) Filed: Dec. 5, 2023

(65) Prior Publication Data

US 2024/0213446 A1 Jun. 27, 2024

(30) Foreign Application Priority Data

Dec. 19, 2022 (KR) .................. 10-2022-0177963

(51) Int. Cl.
| | |
|---|---|
| *H01M 4/134* | (2010.01) |
| *H01M 4/133* | (2010.01) |
| *H01M 4/1393* | (2010.01) |
| *H01M 4/1395* | (2010.01) |
| *H01M 4/36* | (2006.01) |
| *H01M 4/48* | (2010.01) |
| *H01M 4/587* | (2010.01) |
| *H01M 4/62* | (2006.01) |
| *H01M 10/0525* | (2010.01) |
| *H01M 10/42* | (2006.01) |
| *H01M 4/02* | (2006.01) |
| *H01M 4/04* | (2006.01) |

(52) U.S. Cl.
CPC ........... *H01M 4/134* (2013.01); *H01M 4/133* (2013.01); *H01M 4/1393* (2013.01); *H01M 4/1395* (2013.01); *H01M 4/364* (2013.01); *H01M 4/366* (2013.01); *H01M 4/483* (2013.01); *H01M 4/587* (2013.01); *H01M 4/622* (2013.01); *H01M 4/625* (2013.01); *H01M 10/0525* (2013.01); *H01M 10/4235* (2013.01); *H01M 2004/027* (2013.01); *H01M 4/0404* (2013.01); *H01M 4/0471* (2013.01)

(58) Field of Classification Search
CPC ...... H01M 4/134; H01M 4/366; H01M 4/622; H01M 4/62; H01M 10/0568; H01M 10/0525

See application file for complete search history.

(56) References Cited

U.S. PATENT DOCUMENTS 11,114,660 B1 * 9/2021 Ji .......................... H01M 4/622
2019/0214640 A1 7/2019 Salem et al.

FOREIGN PATENT DOCUMENTS

| CA | 3 157 142 | * | 7/2021 |
|---|---|---|---|
| CN | 112736247 A | | 4/2021 |
| JP | 2005-011696 A | | 1/2005 |
| JP | 2006-196339 A | | 7/2006 |
| KR | 10-1591698 B1 | | 2/2016 |
| KR | 2017-0042115 | * | 4/2017 |
| KR | 10-2018-0054589 A | | 5/2018 |
| KR | 10-2022-0109699 A | | 8/2022 |
| WO | WO 2016/057369 | * | 4/2016 |
| WO | 2018/123751 A1 | | 7/2018 |

OTHER PUBLICATIONS

Extended European Search Report for European Patent Application No. 23217063.9 issued by the European Patent Office on Aug. 6, 2024.

* cited by examiner

*Primary Examiner* — Laura Weiner
(74) *Attorney, Agent, or Firm* — IP & T GROUP LLP (57) ABSTRACT

An anode active material for a secondary battery includes an anode current collector, and an anode active material layer on at least one surface of the anode current collector. The anode active material layer includes an anode active material and an anode binder. The anode active material includes a composite particle that includes a silicon-based active material particle and a solid electrolyte interphase (SEI) layer formed on at least a portion of a surface of the silicon-based active material particle. An F-density defined by Equation 1 is 23% or less.

5 Claims, 2 Drawing Sheets

ANODE FOR LITHIUM SECONDARY BATTERY, METHOD OF MANUFACTURING THE SAME AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2022-0177963 filed on Dec. 19, 2022 in the Korean Intellectual Property Office (KIPO), the entire disclosure of which is incorporated by reference herein.

BACKGROUND

1. Field

The disclosure of the present application relates to an anode for a lithium secondary battery, a method of manufacturing the same and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery has been developed and applied as a power source for an eco-friendly vehicle such as an electric vehicle.

Examples of the secondary battery includes, e.g., a lithium secondary battery, a nickel-cadmium battery, a nickel-hydrogen battery, etc. The lithium secondary battery is being actively developed and applied due to high operational voltage and energy density per unit weight, a high charging rate, a compact dimension, etc.

Recently, as an application range of the lithium secondary battery is expanded, a lithium secondary battery having higher capacity and power has been developed. For example, silicon-based particles having high capacities may be used as an anode active material.

For example, a solid electrolyte interface (SEI) layer may be formed on a surface of the silicon-based particle. For example, the silicon-based particles may have a relatively large volume expansion ratio, and the SEI layer may be non-uniformly formed, thereby degrading the life-span properties of the lithium secondary battery.

SUMMARY

According to an aspect of the present disclosure, there is provided an anode for a lithium secondary battery having improved life-span properties and operational stability.

According to an aspect of the present disclosure, there is provided a method of manufacturing an anode for a lithium secondary battery having improved life-span properties and operational stability.

According to an aspect of the present disclosure, there is provided a lithium secondary battery including an anode for a lithium secondary battery with improved life-span properties and operational stability.

According to embodiments of the present disclosure, an anode for a lithium secondary battery includes an anode current collector, and an anode active material layer on at least one surface of the anode current collector, the anode active material layer including an anode active material and an anode binder. The anode active material includes a composite particle that includes a silicon-based active material particle and a solid electrolyte interphase (SEI) layer formed on at least a portion of a surface of the silicon-based active material particle. An F-density defined by Equation 1 is 23% or less.

$$F\text{-density } (\%) = (F_C / F_T) * 100 \qquad \text{[Equation 1]}$$

In Equation 1, $F_C$ is an area of a portion where an F-intensity obtained by scanning a cross-sectional image of the anode active material layer from a scanning electron microscope-energy dispersion X-ray spectroscopy (SEM-EDS) analysis with a fluorine (F) element is 58% or more. $F_T$ is a total area from which the F element obtained by scanning the cross-sectional image of the anode active material layer from the SEM-EDS analysis with the F element is detected.

In some embodiments, the F-density may be 20% or less.

In some embodiments, the silicon-based active material particle may include at least one selected from the group consisting of Si, SiOx (0<x≤2) and a Si—C composite.

In some embodiments, the F-density may be an average of F-density values measured for nine different portions of the anode active material layer.

In some embodiments, three of the nine different portions of the anode active material layer may be selected from one end portion in a length direction of the anode active material layer. Another three of the nine different portions of the anode active material layer may be selected from the other end portion in the length direction of the anode active material layer. The other three of the nine different portions of the anode active material layer may be selected from a central portion in the length direction of the anode active material layer.

In some embodiments, the anode active material may further include a graphite-based active material particle.

In some embodiments, the anode binder may include a polyacrylic acid-based copolymer.

In some embodiments, a ratio of the number of moles of repeating units derived from a polyacrylic acid to the total number of moles of repeating units included in one molecule of the polyacrylic acid-based copolymer may be greater than 0.25 and less than 0.7.

In some embodiments, a ratio of the number of moles of repeating units derived from a polyacrylic acid to the total number of moles of repeating units included in one molecule of the polyacrylic acid-based copolymer may be in a range from 0.4 to 0.55.

In some embodiments, the composite particle may further include a carbon coating formed on at least a portion of the surface of the silicon-based active material particle.

A lithium secondary battery according to embodiments of the present disclosure includes the anode for a lithium secondary battery of the above-describe embodiments, and a cathode facing the anode.

In a method of preparing an anode for a lithium secondary battery according to embodiments of the present disclosure, a silicon-based active material particle is prepared. An anode active material containing the silicon-based active material particle and an anode binder containing a polyacrylic acid-based copolymer are mixed in a solvent to form a mixture. The mixture is diluted with the solvent to form a slurry. The slurry is coated on at least one surface of the anode current collector. A solid content in the mixture is in a range from 50 wt % to 80 wt % based on a total weight of the mixture.

In some embodiments, the silicon-based active material particle and a carbon source gas may be mixed and fired to form a carbon coating on at least a portion of a surface of the silicon-based active material particle.

In some embodiments, the mixture may be formed by mixing the anode active material and the anode binder in the solvent for 10 minutes to 110 minutes.

According to one embodiment of the present disclosure, capacity and life-span properties of the anode for a lithium secondary battery may be improved.

According to one embodiment of the present disclosure, a side reaction between the silicon-based active material particle may be suppressed and the electrolyte and life-span properties of the lithium secondary battery may be improved.

The anode and the lithium secondary battery of the present disclosure may be widely applied in green technology fields such as an electric vehicle, a battery charging station, solar power generation wind power generation, etc., using batteries. The anode and the lithium secondary battery according to the present disclosure may be used for eco-friendly electric vehicles and hybrid vehicles to prevent a climate change by suppressing air pollution and greenhouse gas emission., etc.

DETAILED DESCRIPTION OF THE EMBODIMENTS

According to embodiments of the present disclosure, an anode for a lithium secondary battery including an anode active material and an anode binder is provided. According to embodiments of the present disclosure, a method of manufacturing the anode is provided. According to embodiments of the present disclosure, a lithium secondary battery including the anode is provided.

Hereinafter, detailed descriptions of the present disclosure will be described in detail with reference to example embodiments. However, those skilled in the art will appreciate that such embodiments are provided to further understand the spirit of the present inventive concepts do not limit subject matters to be protected as disclosed in the detailed description and appended claims.

A detailed structure of a lithium secondary battery including an anode for a lithium secondary battery (hereinafter, abbreviated as "anode") will be described later with reference to FIGS. 1 and 2.

In example embodiments, the anode includes an anode current collector and an anode active material layer formed on at least one surface of the anode current collector.

For example, the anode current collector may include a copper foil, a nickel foil, a stainless steel foil, a titanium foil, a nickel foam, a copper foam, a polymer substrate coated with a conductive metal, etc. These may be used alone or in a combination of two or more therefrom. For example, a thickness of the anode current collector 125 may be in a range from 10 μm to 50 μm.

The anode active material layer includes an anode active material for a lithium secondary battery (hereinafter, may be abbreviated as "an anode active material") and an anode binder.

The anode active material includes a composite particle including a silicon-based active material particle and a solid electrolyte interphase (SEI) layer formed on at least a portion of a surface of the silicon-based active material particle. The anode active material may include a plurality of the composite particles.

For example, the silicon-based active material particle may provide high capacity properties to the anode active material.

For example, the silicon-based active material particle may include at least one selected from the group consisting of Si, SiOx ($0<x\leq2$) and a Si—C composite.

For example, the Si—C composite may include a metallurgical grade silicon.

For example, the Si—C composite may include a porous structure in which a silicon-containing coating is formed on a porous carbon particle including a plurality of pores. For example, the silicon-containing coating may be formed on at least one of an inside of the pore and a surface of the porous carbon particle. Accordingly, cracks due to a difference of volume expansion ratios between carbon and silicon may be prevented during charging and discharging of a lithium secondary battery.

For example, the Si—C composite may include a particle in which a silicon element and a carbon element are aggregated and integral with each other.

In one embodiment, the silicon-based active material particle may include SiOx ($0<x\leq2$), and in some embodiments, may include SiOx ($0<x<2$). In this case, the volume expansion ratio may become lowered compared to that of Si, so that life-span properties may be improved.

In some embodiments, the silicon-based active material particle may be doped with an auxiliary element to reduce a resistance and improve power properties.

For example, the auxiliary element doped into the silicon-based active material particle may include at least one metal selected from the group consisting of Li, Mg, Al, Ca, Fe, Ti and V.

In one embodiment, the auxiliary element may include Li or Mg.

For example, the SEI layer may be formed on the surface of the composite particle through a reaction between the silicon-based active material particle and an electrolyte solution. For example, a side reaction between the silicon-based active material particle and the electrolyte solution may be suppressed by the SEI layer. Accordingly, the life-span properties of the lithium secondary battery may be improved.

For example, the SEI layer may include LiF.

For example, the SEI layer of the composite particle may be formed non-uniformly on the silicon-based active material particle. In this case, the side reaction between the silicon-based active material particle and the electrolyte solution may be increased and a capacity retention of the lithium secondary battery during repeated charging and discharging may be degraded.

According to embodiments of the present disclosure, an F-density defined by Equation 1 below is 23% or less. In some embodiments, the F-density may be 20% or less.

$$F\text{-density }(\%) = (Fc/Fr)*100 \qquad \text{[Equation 1]}$$

In Equation 1, $F_C$ is an area of a portion where the F-intensity obtained by scanning a cross-sectional image of the anode active material layer from a scanning electron microscope-energy dispersion X-ray spectroscopy (SEM-EDS) analysis with a fluorine (F) element is 58% or more.

In Equation 1, $F_T$ is a total area from which the F element obtained by scanning the cross-sectional image of the anode active material layer from the SEM-EDS analysis with the F element is detected.

For example, the SEM-EDS analysis may be performed on a cross-section of the anode active material layer to obtain the cross-sectional image of the anode active material layer. The obtained cross-sectional image of the anode active material layer may be scanned with the F element to measure a total area ($F_T$) in which the F element is detected.

For example, after scanning the obtained cross-sectional image of the anode active material layer with the F element, a final image represented by different colors according to an F intensity may be obtained. For example, a portion with the F intensity of 58% or more may be marked with light green, yellow or red. The area $F_C$ of a portion where the F intensity is 58% or more may be measured from the final image.

In some embodiments, $F_C$ may be an area of a portion where the F intensity is from 60% to 100%.

For example, the F intensity may be defined as a percentage of a concentration of the F element in the SEM-EDS analysis.

For example, $F_C$ may represent an area of a region where the F element included in the SEI layer is non-uniformly distributed. By substituting the measured $F_C$ and $F_T$ into Equation 1, a ratio of an area of the region where the F element is unevenly distributed to an entire area where the F element is detected may be calculated.

In the F density range, the SEI layer may uniformly cover the surface of the silicon-based active material particle to suppress a side reaction between the silicon-based active material particle and the electrolyte and to improve life-span properties of the lithium secondary battery.

For example, the SEM-EDS analysis may be performed on the cross-section of the anode active material layer to obtain an image of the cross-section of the anode active material layer. For example, the cross-section of the anode active material layer may be enlarged by 1500 magnification to perform the SEM-EDS analysis.

In one embodiment, the above-described method of measuring the F density may be performed on a range of about 80 μm×50 μm in the cross-section of the anode active material layer.

Reliability and reproducibility of the measured F-density value may be improved by using the above-described measurement method.

In some embodiments, the F-density values may be measured through the SEM-EDS analysis with respect to nine different points of the anode active material layer included in the anode. An average of the F density values may be calculated by summing all nine measured F density values and dividing them by 9.

For example, three of the nine different points of the anode active material layer may be selected at one end portion in a length direction of the anode active material layer, another three of the nine different points of the anode active material layer may be selected at the other end portion in the length direction of the anode active material layer, and the other three of the nine different points of the anode active material layer may be selected at a central portion in the length direction of the anode active material layer. Accordingly, a density distribution of the F element may be measured in the entire anode active material layer.

For example, the central portion of the anode active material layer in the length direction may represent a region between the one end portion in the length direction and the other end portion in the length direction.

In some embodiments, the anode active material may further include a graphite-based active material particle. For example, the graphite-based active material particle may include at least one selected from the group consisting of artificial graphite and natural graphite. The anode active material may include a plurality of the graphite-based active material particles.

For example, a content of the graphite-based active material particle may be in a range from 30 weight percent (wt %) to 90 wt % based on a total weight of the anode active material. In this range, the life-span properties may be improved while suppressing reduction of the capacity of the anode active material.

A content of the composite particles based on the total weight of the anode active material (e.g., a total weight of the plurality of the composite particles and the graphite-based active material) may be 3 wt % or more, 5 wt % or more, 10 wt % or more, 15 wt % or more, 20 wt % or more, 25 wt % or more, 30 wt % or more, 35 wt % or more, 40 wt % or more, or 45 wt % or more The content of the composite particles based on the total weight of the anode active material may be 98 wt % or less, 95 wt % or less, 90 wt % or less, 85 wt % or less, 80 wt % or less, 75 wt % or less, 70 wt % or less, 65 wt % or less, 60 wt % or less, 55 wt % or less, or 50 wt % or less.

In one embodiment, the anode active material may substantially consist of the composite particles and the graphite-based active material.

The anode active material layer includes an anode binder together with the above-described anode active material.

In some embodiments, the anode binder may include a polyacrylic acid-based copolymer.

The term "polyacrylic acid-based copolymer" used herein may refer to a copolymer formed by copolymerizing polyacrylic acid and a different polymer.

The polyacrylic acid-based copolymer may serve as, e.g., a hydrophilic binder containing a large amount of oxygen functional groups. The oxygen functional group may contribute to the formation of a thin, uniform and high-strength SEI layer. Accordingly, the life-span properties of the lithium secondary battery may be improved.

For example, the different polymer copolymerized with a polyacrylic acid may contain polyvinyl alcohol.

In some embodiments, the polyacrylic acid-based copolymer may include a repeating unit derived from a polyacrylic acid.

For example, a ratio of the number of moles of the polyacrylic acid-derived repeating unit relative to the total number of moles of repeating units included in one molecule of the polyacrylic acid-based copolymer may be greater than 0.25 and less than 0.7, and in some embodiments, may be in a range from 0.4 to 0.55. Within the above range, the anode binder may be uniformly combined with the composite particles to uniformly form the SEI layer, and hydrophilicity of the anode binder may be properly maintained to improve a binding property to the anode active material In some embodiments, the composite particle may further include a carbon coating formed on at least a portion of the surface of the silicon-based active material particle. Accordingly, the resistance of the anode active material may be reduced and the side reaction with the electrolyte may be prevented by the carbon coating. Thus, the capacity and life-span properties of the anode active material may be improved.

For example, the carbon coating may include carbon or a conductive polymer. For example, the conductive polymer may include polyacetylene, polyaniline, polypyrrole and/or polythiophene.

For example, an electron affinity between the anode active material and the anode binder may be improved through the carbon coating. Accordingly, the composite particle may be protected by the cathode binder.

In some embodiments, a content of the carbon coating may be in a range from 1 wt % to 8 wt % based on the total weight of the composite particle. Within the above range, the reduction of the capacity of the anode active material may be prevented while sufficiently suppressing the side reaction with the electrolyte, thereby improving the life-span properties.

Hereinafter, a method of manufacturing the above-described anode for a lithium secondary battery according to exemplary embodiments is provided.

In example embodiments, silicon-based active material particles are prepared.

In one embodiment, a silicon source may be mixed and fired to form the silicon-based active material particles.

For example, the silicon source may include at least one selected from the group consisting of silicon and silicon dioxide ($SiO_2$). In one embodiment, a mixture of silicon and silicon dioxide may be used as the silicon source.

For example, the silicon source may be mixed and introduced into a reactor, and firing may be performed at a temperature in a range from 400° C. to 800° C. under a vacuum atmosphere. The silicon-based active material particles can be prepared by cooling, grinding and classifying the mixture of the fired silicon source.

In one embodiment, the silicon-based active material particle may include silicon monoxide (SiO).

In some embodiments, the prepared silicon-based active material particles and a carbon source gas may be mixed and fired to form the carbon coating on at least a portion of the surface of the silicon-based active material particle.

The carbon source gas may include a mixed gas of, e.g., a methane gas and an argon gas.

In some embodiments, the methane gas may be replaced with an ethylene gas, a propylene gas or an acetylene gas, or may be used together with the ethylene gas, the propylene gas or the acetylene gas.

In some embodiments, the carbon coating may be formed by a chemical vapor deposition (CVD) process. For example, the carbon coating may be formed by injecting the carbon source gas into a plurality of the silicon-based active material particles and firing at a temperature in a range from about 400° C. to 1200° C. For example, a ramping rate during the firing may be in a range from 5° C./min to 20° C./min, and a firing time may be in a range from 60 minutes to 360 minutes.

In example embodiments, the anode active material including the prepared silicon-based active material particles and the anode binder including the polyacrylic acid-based copolymer may be mixed in a solvent to form a mixture.

For example, the solvent may be deionized water.

For example, during the mixing, the silicon-based active material particles and the polyacrylic acid-based copolymers may be bonded. For example, the silicon-based active material particles and the polyacrylic acid-based copolymer may be combined to form secondary particles.

In some embodiments, a solid content included in the mixture may be in a range from 50 wt % to 80 wt %, and in some embodiments, may be in a range from 60 wt % to 70 wt %. Within the above range, the hydrophilic polyacrylic copolymer may be sufficiently mixed and combined with the relatively hydrophobic anode active material. Accordingly, when the silicon-based active material particles contact the electrolyte, the SEI layer may be uniformly formed, and the life-span properties of the lithium secondary battery may be improved.

he solid content may include, e.g., the anode active material, the anode binder, a conductive material and/or a thickener.

In some embodiments, the mixture may be formed by mixing the anode active material and the anode binder in a solvent for 10 minutes to 110 minutes, and in some embodiments, by mixing for 25 minutes to 50 minutes. Within the above range, the SEI layer may be uniformly formed on the silicon-based active material particle while sufficiently combining the silicon-based active material particles and the polyacrylic copolymer. Thus, the capacity retention during the repeated charging and discharging of the lithium secondary battery may be enhanced.

For example, the mixture may further include the thickener and/or the conductive material.

For example, the thickener may include carboxymethyl cellulose (CMC).

The conductive material may be included to promote, e.g., an electron movement between the active material particles. For example, the conductive material may include a carbon-based conductive material such as graphite, carbon black, graphene, carbon nanotube, etc., and/or a metal-based conductive material including tin, tin oxide, titanium oxide, a perovskite material such as $LaSrCoO_3$ and $LaSrMnO_3$.

In example embodiments, the slurry may be prepared by diluting the mixture in a solvent (e.g., pure water). Coating properties of the slurry may be improved by adjusting a viscosity of the slurry through the dilution. For example, a solid content of the slurry may be controlled in a range from about 40 wt % to 50 wt % based on a total weight of the slurry by the dilution.

In example embodiments, the slurry may be coated on the anode current collector, dried and pressed to form the anode. For example, the slurry may be coated/deposited on the anode current collector 125, and then dried and pressed to prepare the anode active material layer. The coating may include a gravure coating, a slot die coating, a multi-layered simultaneous die coating, an imprinting, a doctor blade coating, a dip coating, a bar coating, a casting, etc.

For example, the anode may contact an electrolyte solution within a lithium secondary battery. For example, the above-described SEI layer may be formed on the surface portion of the composite particle after the anode contacts the electrolyte solution and/or after formation charging and discharging of the lithium secondary battery including the anode.

In example embodiments, the F density defined by Equation 1 of the anode manufactured by the method as described above may be 23% or less. Therefore, the SEI layer may sufficiently protect the surface of the silicon-based active material particle, thereby improving the life-span properties of the lithium secondary battery.

Figure 1:
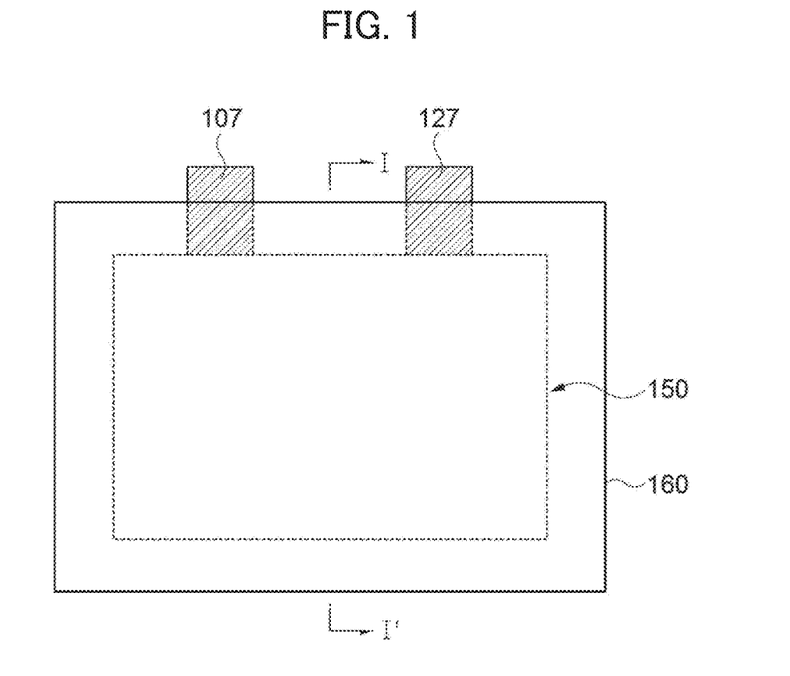
FIGS. 1 and 2 are a schematic plan view and a schematic cross-sectional view, respectively, illustrating a secondary battery in accordance with example embodiments.
Figure 2:
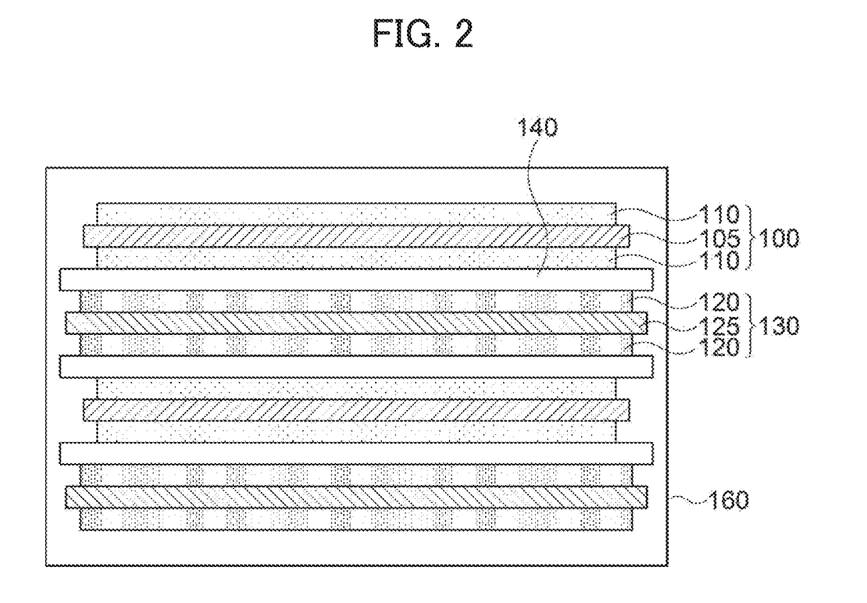

FIGS. 1 and 2 are a schematic plan view and a schematic cross-sectional view, respectively, illustrating a secondary battery in accordance with example embodiments.

Referring to FIGS. 1 and 2, the lithium secondary battery includes the above-described anode 130 and a cathode 100 facing the anode 130.

For example, the cathode 100 may include a cathode current collector 105 and a cathode active material layer 110 disposed on at least one surface of the cathode current collector 105.

The cathode current collector 105 may include stainless steel, nickel, aluminum, titanium, or an alloy thereof. The cathode current collector 105 may include aluminum or stainless steel surface-treated with carbon, nickel, titanium or silver. For example, a thickness of the cathode current collector 105 may be in a range from 10 μm to 50 μm.

The cathode active material layer 110 may include a cathode active material. The cathode active material may include a compound capable of reversibly intercalating and de-intercalating lithium ions.

In example embodiments, the cathode active material may include a lithium-nickel metal oxide. The lithium-nickel metal oxide may further include at least one of cobalt (Co), manganese (Mn) and aluminum (Al).

In some embodiments, the cathode active material or the lithium-nickel metal oxide may include a layered structure or a crystal structure represented by Chemical Formula 1 below.

[Chemical Formula 1]

$$Li_xNi_aM_bO_{2+z}$$

In Chemical Formula 1, $0.9 \leq x \leq 1.2$, $0.6 \leq a \leq 0.99$, $0.01 \leq b \leq 0.4$ and $-0.5 \leq z \leq 0.1$. As mentioned above, M may include Co and/or Mn.

The chemical structure represented by Chemical Formula 1 indicates a bonding relationship included in the layered structure or the crystal structure of the cathode active material, and is not intended to exclude another additional element. For example, M includes Co and/or Mn, and Co and/or Mn may serve as main active elements of the cathode active material together with Ni. Chemical Formula 1 is provided to express the bonding relationship of the main active elements, and is to be understood as a formula encompassing introduction and substitution of the additional element.

In an embodiment, an auxiliary element for enhancing chemical stability of the cathode active material or the layered structure/crystal structure may be further included in addition to the main active element. The auxiliary element may be incorporated into the layered structure/crystal structure to form a bond, and it is to be understood that this case is also included within the chemical structure represented by Chemical Formula 1.

The auxiliary element may include at least one of, e.g., Na, Mg, Ca, Y, Ti, Hf, V, Nb, Ta, Cr, Mo, W, Fe, Cu, Ag, Zn, B, Al, Ga, C, Si, Sn, Sr, Ba, Ra, P or Zr. The auxiliary element may act as an auxiliary active element such as Al which may contribute to capacity/power activity of the cathode active material together with Co or Mn.

For example, the cathode active material or the lithium-nickel metal oxide may have a layered structure or a crystal structure represented by Chemical Formula 1-1 below.

[Formula 1-1]

$$Li_xNi_aM1_{b1}M2_{b2}O_{2+z}$$

In Chemical Formula 1-1, M1 may include Co, Mn and/or Al. M2 may include the above-described auxiliary element. In Chemical Formula 1-1, $0.9 \leq x \leq 1.2$, $0.6 \leq a \leq 0.99$, $0.01 \leq b1+b2 \leq 0.4$, and $-0.5 \leq z \leq 0.1$.

The cathode active material may further include a coating element or a doping element. For example, an element substantially the same as or similar to the above-mentioned auxiliary element may be used as the coating element or the doping element. For example, one of the above elements or a combination of two or more therefrom may be used as the coating element or the doping element.

The coating element or the doping element may be present on a surface of the lithium-nickel metal oxide particle or may penetrate through the surface of the lithium-nickel metal oxide particle and be included in the bonding structure represented by Chemical Formula 1 or Chemical Formula 1-1.

The cathode active material may include a nickel-cobalt-manganese (NCM)-based lithium oxide. In this case, an NCM-based lithium oxide having an increased nickel content may be used.

Ni may serve as a transition metal related to power and capacity of a lithium secondary battery. Therefore, as described above, a high-Ni composition may be employed for the cathode active material, so that a high-capacity cathode and a high-capacity lithium secondary battery may be implemented.

However, as the content of Ni increases, long-term storage stability and life-span stability of the cathode or the secondary battery may be relatively deteriorated, and side reactions with the electrolyte may be also increased. However, according to example embodiments, life-span stability and capacity retention may be improved by Mn while maintaining electrical conductivity by the inclusion of Co.

A Ni content (e.g., A mole fraction of nickel among total moles of nickel, cobalt and manganese) in the NCM-based lithium oxide may be 0.5 or more, 0.6 or more, 0.7 or more, or 0.8 or more. In some embodiments, the Ni content may be from 0.8 to 0.95, from 0.82 to 0.95, from 0.83 to 0.95, from 0.84 to 0.95, from 0.85 to 0.95, or from 0.88 to 0.95.

In some embodiments, the cathode active material may include a lithium cobalt oxide-based active material, a lithium manganese oxide-based active material, a lithium nickel oxide-based active material, or a lithium iron phosphate (LFP) active material (e.g., $LiFePO_4$).

In some embodiments, the cathode active material may include a Li-rich layered oxide (LLO)/an over lithiated oxide (OLO)-based active material, a Mn-rich-based active material, a Co-less active materials, etc., having, e.g., a chemical structure or a crystal structure represented by Chemical Formula 2. These may be used alone or in a combination thereof

[Chemical Formula 2]

$$p[Li_2MnO_3] \cdot (1-p)[Li_qJO_2]$$

In Chemical Formula 2, $0<p<1$, $0.9 \leq q \leq 1.2$, and J includes at least one element selected from the group consisting of Mn, Ni, Co, Fe, Cr, V, Cu, Zn, Ti, Al, Mg and B.

A cathode slurry may be prepared by mixing the cathode active material in a solvent. The cathode slurry may be coated on at least one surface of the cathode current collector 105, and dried and pressed to form the cathode active material layer 110. The coating method may include a gravure coating, a slot die coating, a multi-layer simultaneous die coating, an imprinting coating, a doctor blade coating, a dip coating, a bar coating, a casting, etc. The cathode active material layer 110 may further include a binder, and may optionally further include a conductive material, a thickener, etc.

A non-aqueous solvent may be used as the solvent. For example, N-methyl-2-pyrrolidone (NMP), dimethylformamide, dimethylacetamide, N,N-dimethylaminopropylamine, ethylene oxide, tetrahydrofuran, etc., may be used as the solvent.

For example, the binder may include an organic based binder such as polyvinylidenefluoride (PVDF), a vinylidene fluoride-hexafluoropropylene copolymer (PVDF-Co-HFP), polyacrylonitrile, polymethylmethacrylate, or an aqueous binder such as styrene-butadiene rubber (SBR), etc., that may be used together with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may include a material the same as or similar to that used for the anode.

The anode 130 may include an anode current collector 125 and an anode active material layer 120 including the above-described composite particles on at least one surface of the anode current collector 125.

In some embodiments, a separator 140 may be interposed between the anode 100 and the cathode 130. For example, the separator 140 may include a porous polymer film or a porous nonwoven fabric. The porous polymer film may include a polyolefin-based polymer such as an ethylene polymer, a propylene polymer, an ethylene/butene copolymer, an ethylene/hexene copolymer, an ethylene/methacrylate copolymer, etc.

The porous nonwoven fabric may include a glass fiber with a high melting point, a polyethylene terephthalate fiber, etc.

In example embodiments, an electrode cell may be defined by the cathode 100, the anode 130 and the separator 140, and a plurality of the electrode cells may be stacked to form an electrode assembly 150 having, e.g., a jellyroll shape. For example, the electrode assembly 150 may be formed by winding, stacking, z-folding or stack-folding of the separator 140.

The electrode assembly 150 may be accommodated in a case 160 together with an electrolyte to define a lithium secondary battery. In example embodiments, a non-aqueous electrolyte may be used as the electrolyte.

The non-aqueous electrolyte may include a lithium salt and an organic solvent. The lithium salt and may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), butylene carbonate, diethyl carbonate (DEC), dimethyl carbonate (DMC), ethylmethyl carbonate (EMC), methylpropyl carbonate, ethylpropyl carbonate, dipropyl carbonate, vinylene carbonate, methyl acetate (MA), ethyl acetate (EA), n-propylacetate (n-PA), 1,1-dimethyl ethyl acetate (DMEA), methyl propionate (MP), ethylpropionate (EP), fluoroethyl acetate (FEA), difluoroethyl acetate (DFEA), trifluoroethyl acetate (TFEA), dibutyl ether, tetraethylene glycol dimethyl ether (TEGDME), diethylene glycol dimethyl ether (DEGDME), dimethoxyethane, tetrahydrofuran (THF), 2-methyltetrahydrofuran, ethyl alcohol, isopropyl alcohol, dimethylsulfoxide, acetonitrile, diethoxyethane, sulfolane, gamma-butyrolactone, propylene sulfite, etc. These may be used alone or in a combination thereof.

The non-aqueous electrolyte may further include an additive. The additive may include, e.g., a cyclic carbonate-based compound, a fluorine-substituted carbonate-based compound, a sultone-based compound, a cyclic sulfate-based compound, a cyclic sulfite-based compound, a phosphate-based compound, a borate-based compound, etc. These may be used alone or in a combination thereof.

The cyclic carbonate-based compound may include vinylene carbonate (VC), vinyl ethylene carbonate (VEC), etc.

The fluorine-substituted cyclic carbonate-based compound may include fluoroethylene carbonate (FEC), etc.

The sultone-based compound may include 1,3-propane sultone, 1,3-propene sultone, 1,4-butane sultone. etc.

The cyclic sulfate-based compound may include 1,2-ethylene sulfate, 1,2-propylene sulfate, etc.

The cyclic sulfite-based compound may include ethylene sulfite, butylene sulfite, etc.

The phosphate-based compound may include lithium difluoro bis-oxalato phosphate, lithium difluoro phosphate, etc.

The borate-based compound may include lithium bis (oxalate) borate, etc.

In some embodiments, a solid electrolyte may be used instead of the above-mentioned non-aqueous electrolyte. In this case, the lithium secondary battery may be manufactured in the form of an all-solid-state battery. Additionally, a solid electrolyte layer may be disposed between the anode 100 and the cathode 130 instead of the above-described separator 140.

The solid electrolyte may include a sulfide-based electrolyte. Non-limiting examples of the sulfide-based electrolyte may include $Li_2S$—$P_2S_5$, $Li_2S$—$P_2S_5$—$LiCl$, $Li_2S$—$P_2S_5$—$LiBr$, $Li_2S$—$P_2S_5$—$LiCl$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n are positive numbers, and Z represents Ge, Zn pr Ga), $Li_2S$—$GeS_2$, $Li_2S$—$SiS_2$—$Li_3PO_4$, $Li_2S$—$SiS_2$—$Li_pMO_q$, (p and q are positive numbers, M represents P, Si, Ge, B, Al, Ga or In), $Li_7$–$xPS_6$–$xCl_x$ ($0 \leq x \leq 2$), $Li_7$–$xPS_6$–$xBr_x$ ($0 \leq x \leq 2$), $Li_7$–$xPS_6$–$xI_x$ ($0 \leq x \leq 2$), etc. These may be used alone in a combination thereof.

In an embodiment, the solid electrolyte may include, e.g., an oxide-based amorphous solid electrolyte such as $Li_2O$—$B_2O_3$—$P_2O_5$, $Li_2O$—$SiO_2$, $Li_2O$—$B_2O_3$, $Li_2O$—$B_2O_3$—$ZnO$, etc.

As illustrated in FIG. 1, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode lead 127) extending or exposed to an outside of the case 160.

The lithium secondary battery may be manufactured in, e.g., a cylindrical shape using a can, a square shape, a pouch shape or a coin shape.

Hereinafter, experimental examples are proposed to more concretely describe the present disclosure. However, the following examples are only given for illustrating the present disclosure and those skilled in the related art will obviously understand that various alterations and modifications are possible within the scope and spirit of the present disclosure. Such alterations and modifications are duly included in the appended claims.

Examples 1 to 9 and Comparative Examples 2 to 4

(1) Fabrication of Anode
1) Preparing Silicon-Based Active Material Particle

An anode active material SiOx ($0<x\leq2$) manufacture from Ningbo ShanShan was used as silicon-based active material particles.

2) Preparing Anode Binder

A polyacrylic acid-polyvinyl alcohol copolymer was used as an anode binder.

Specifically, monomers of polyacrylic acid and polyvinyl alcohol were copolymerized, and then a polyacrylic acid-polyvinyl alcohol copolymer was prepared through an esterification reaction.

An input amount of the polyacrylic acid monomer was adjusted so that a ratio of the number of moles of polyacrylic acid-derived repeating units to the total number of moles of repeating units included in one molecule of the polyacrylic acid-polyvinyl alcohol copolymer (a molar ratio of PAA-derived repeating unit of Table 1) was controlled as shown in Table 1 below.

3) Fabrication of Anode

An anode mixture was prepared by mixing 71.8 wt % of artificial graphite, 25 wt % of the silicon-based active material particles, 2.7 wt % of the polyacrylic acid-polyvinyl alcohol copolymer and 0.5 wt % of carbon nanotube (CNT) as a conductive material in a deionized water solvent.

An amount of the deionized water solvent was adjusted so that a solid content (solid contents in Table 1) included in the anode mixture relative to a total weight of the manufactured anode mixture was controlled as shown in Table 1.

The mixing was performed for a period shown in Table 1 (a mixing time of Table 1).

After the mixing, pure water was added and the slurry was diluted to prepare an anode slurry having a solid content of 40 wt % and a viscosity in a range from 5,000 cP to 7,000 cP.

The anode slurry was coated, dried and pressed on a copper substrate to form an anode active material layer. Accordingly, an anode including an anode current collector (the copper substrate) and the anode active material layer was obtained.

(2) Fabrication of Lithium Secondary Battery $LiNi_{0.8}Co_{0.1}Mn_{0.1}O_2$ as a cathode active material, Denka Black as a conductive material and PVDF as a binder were mixed in a mass ratio of 95.5:3:1.5 to prepare a cathode mixture. The cathode mixture was coated on an aluminum current collector having an initial thickness of 12.0 μm, and then dried and pressed to prepare a cathode in which a cathode active material layer was formed on the current collector.

The cathode and the anode manufactured as described above were notched to a predetermined size and stacked with a separator (polyethylene, thickness of 15 μm) interposed therebetween to form an electrode cell, and tab portions of the cathode and the anode were welded. The welded anode/separator/cathode assembly was placed in a pouch, and three sides were sealed except for an electrolyte injection side. The tab portions were included in the sealing portion. An electrolyte solution was injected through the electrolyte injection side, the electrolyte injection side was also sealed, and then impregnation was performed for 12 hours or more to obtain a pouch cell with a capacity of 80 Ah.

In the preparation of the electrolyte solution, a 1M $LiPF_6$ solution was prepared using a mixed solvent of EC/EMC (3:7; volume ratio), and 2 vol % of FEC based on a total volume of the electrolyte solution was added.

Thereafter, pre-charging was performed for 36 minutes with a current corresponding to 0.25C. After 1 hour, degassing, aging for more than 24 hours, and then a formation charging and discharging were performed (charging condition CC-CV 0.2C 3.9V 0.05C CUT-OFF, discharging condition CC 0.2C 2.5V CUTOFF).

Thereafter, standard charging and discharging was performed (charging condition CC-CV 0.33C 4.2V 0.05C CUT-OFF, discharging condition CC 0.33C 2.5V CUT-OFF).

Comparative Example 1

An anode and a lithium secondary battery were manufactured by the same method as that in Example 2, except that 1.2 wt % of carboxymethyl cellulose (CMC) and 1.5 wt % of styrene-butadiene rubber (SBR) were used as the anode binder instead of 2.7 wt % of the polyacrylic acid-polyvinyl alcohol copolymer.

Experimental Example (1) SEM-EDS Analysis
1) Measurement of F-density

The lithium secondary batteries prepared according to Examples and Comparative Examples as described above were discharged (CC 0.01C 2.5V CUT-OFF), and then disassembled to obtain the anode. The obtained anode was washed using dimethyl carbonate (DMC) for 3 days or more and dried.

Samples were prepared by selecting 3 parts from one end portions in a length direction of the anode, 3 parts from the other end portion in the length direction, and 3 parts from a central portion in the length direction. An SEM-EDS analysis was performed on each sample to obtain 1500 magnification cross-sectional images of the anode active material layer. Each of the obtained cross-sectional images was scanned with F element included in a SEI layer to obtain final cross-sectional images representing different colors depending on an F-intensity.

Bruker's FlatQUAD XFlash150 was used as the SEM-EDS analysis equipment.

For each cross-sectional image of each part, a total area ($F_T$) where the F element was scanned (an area where the F element was detected) and a sum ($F_C$) of areas with the F intensity of 58% or more (green, yellow and/or red in the final cross-sectional image) were measured. The measured values were substituted into Equation 1 to measure the F density of each of the nine samples.

An average of the F density values of the nine measured samples was calculated and evaluated as the F-density.

(2) Evaluation on Efficiency of Formation Charge and Discharge

Charging and discharging capacities of the lithium secondary batteries prepared according to Examples and Comparative Examples were measured during a formation charging and discharging.

Specifically, each lithium secondary battery was formation-charged to an SOC55% state (CC-CV 0.2C 3.9V CUT-OFF) to measure the charge capacity, and then discharged to an SOCO % state (CC 0.2C 2.5V CUTOFF) to measure the discharge capacity.

The measured discharge capacity was divided by the charging capacity to calculate a formation charge/discharge efficiency as a percentage.

(3) Evaluation on Capacity Retention (500 Cycles)

Charging (CC-CV 0.33C 4.2V 0.05C CUT-OFF) and discharging (CC 0.33C 2.5V CUT-OFF) of the lithium secondary batteries according to Examples and Comparative Examples were performed 500 times at room temperature (25° C.).

A discharge capacity at the 500th cycle was divided by at discharge capacity at the 1st cycle, and expressed as a percentage and evaluate a capacity retention.

The evaluation results are shown in Tables 1 and 2 below.

TABLE 1

| No. | molar ratio of PAA-derived repeating unit | mixing time (min) | solid content (wt %) | F-density (%) |
| --- | --- | --- | --- | --- |
| Example 1 | 0.40 | 20 | 65 | 20.04 |
| Example 2 | 0.40 | 30 | 65 | 19.87 |
| Example 3 | 0.55 | 30 | 65 | 19.66 |
| Example 4 | 0.25 | 30 | 65 | 21.10 |
| Example 5 | 0.70 | 30 | 65 | 21.92 |
| Example 6 | 0.40 | 50 | 65 | 20.12 |
| Example 7 | 0.40 | 8 | 65 | 21.30 |
| Example 8 | 0.40 | 120 | 65 | 22.30 |
| Example 9 | 0.40 | 15 | 65 | 22.95 |
| Comparative Example 1 | — | 30 | 65 | 24.92 |
| Comparative Example 2 | 0.40 | 0 | 65 | 31.85 |
| Comparative Example 3 | 0.40 | 30 | 45 | 28.65 |
| Comparative Example 4 | 0.40 | 30 | 82 | 27.22 |

TABLE 2

| No. | formation charge/discharge efficiency (%) | capacity retention (500 cyc)(%) |
| --- | --- | --- |
| Example 1 | 52.0 | 90.0 |
| Example 2 | 52.0 | 90.3 |
| Example 3 | 52.1 | 90.5 |
| Example 4 | 51.8 | 88.3 |
| Example 5 | 51.5 | 88.1 |
| Example 6 | 52.1 | 90.2 |
| Example 7 | 51.7 | 88.5 |
| Example 8 | 51.8 | 87.7 |
| Example 9 | 51.6 | 87.4 |
| Comparative Example 1 | 51.1 | 82.2 |
| Comparative Example 2 | 51.4 | 82.5 |
| Comparative Example 3 | 50.6 | 82.4 |
| Comparative Example 4 | 50.8 | 84.0 |

Referring to Tables 1 and 2, the batteries of Examples provided generally improved formation charge/discharge efficiency and capacity retention compared to those from Comparative Examples where the F-density defined by Equation 1 exceeded 23%.

Figure 3:
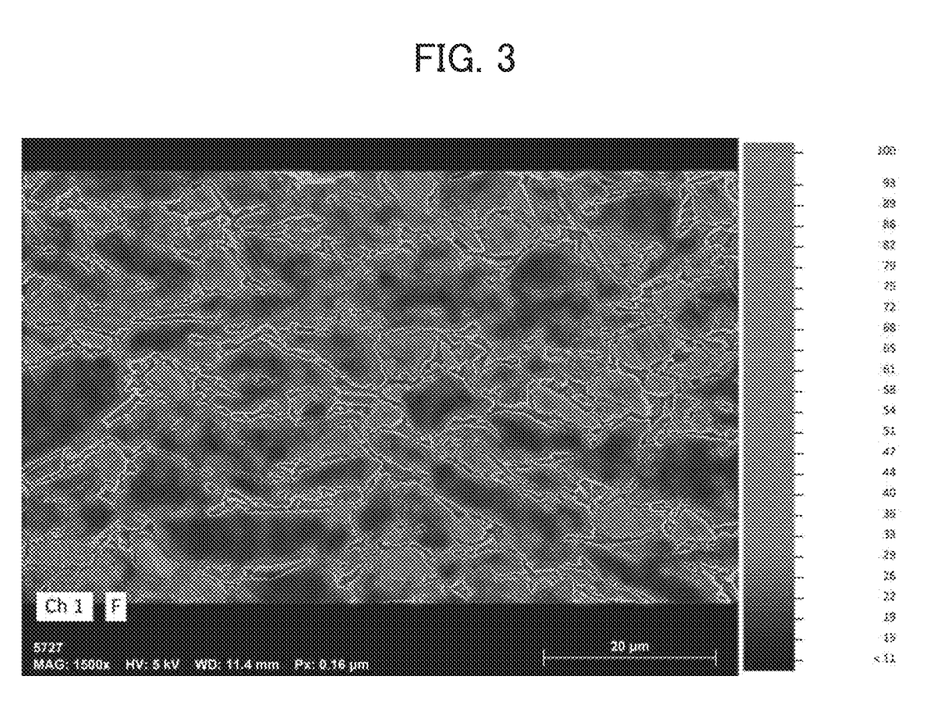
FIG. 3 is an image obtained by scanning a fluorine (F) element with respect to a cross-sectional image of an anode active material layer according to Example 3 from a scanning electron microscope-energy dispersion X-ray spectroscopy (SEM-EDS) analysis.

FIG. 3 is an image obtained by scanning a cross-sectional image of the anode active material layer according to Example 3 from an SEM-EDS analysis with an F element.

Figure 4:
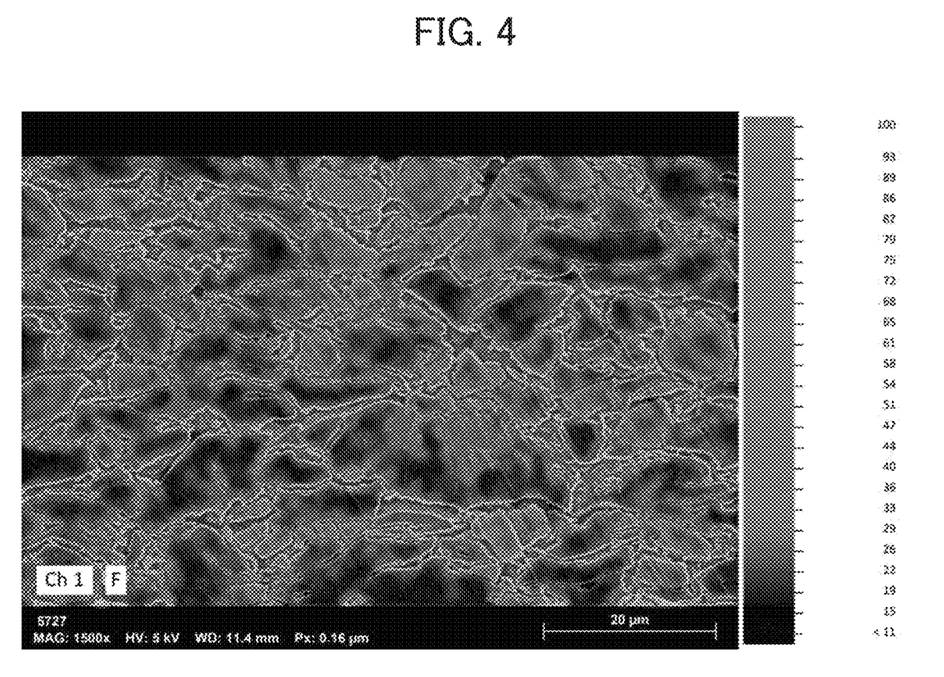
FIG. 4 is an image obtained by scanning an element F with respect to a cross-sectional image of an anode active material layer according to Comparative Example 1 obtained from the SEM-EDS analysis.

FIG. 3 is an image obtained by scanning a cross-sectional image of the anode active material layer according to Comparative Example 1 from an SEM-EDS analysis with an F element.

Referring to FIGS. 3 and 4, a dense area of the SEI layer in Example 3 was reduced compared to that in Comparative Example 1, and uniformity of the SEI layer in Example 3 improved compared to that in Comparative Example 1.

In Examples 1 to 3 where the molar ratio and the mixing time of the PAA-derived repeating unit were within an appropriate range, the F-density was relatively reduced.

In Examples, affinity of the carboxyl group (—COOH) contained in the PAA-derived repeating unit and FEC contained in the electrolyte additive was improved to form a SEI layer uniformly on the surface of the silicon oxide particle.

In Example 4 where the ratio of the number of moles of the polyacrylic acid repeating units to the total number of moles of repeating units contained in one molecule of the polyacrylic acid-based copolymer was 0.25 or less, the F-density increased compared to those from other Examples.

In Example 5 where the ratio of the number of moles of the polyacrylic acid-derived repeating units to the total number of moles of repeating units contained in one molecule of the polyacrylic acid-based copolymer was 0.7 or more, uniformity of the SEI layer was degraded relatively to those from other Examples.

In Example 7 where the mixing time of the anode active material and the anode binder was less than 10 minutes, adhesion between the anode active material and the anode binder was lowered and uniformity of the SEI layer was degraded relatively to those from other Examples.

In Example 8 where the mixing time of the anode active material and the anode binder exceeded 110 minutes, uniformity of the SEI layer after the formation was relatively degraded and the capacity retention was reduced compared to those from other Examples.

In Comparative Example 2 where the mixing process (formation of a secondary particle) of the anode active material and the anode binder was not performed, adhesion between the anode active material and the anode binder was lowered compared to those from Examples. Accordingly, the SEI layer was formed non-uniformly after the formation charging and discharging. Therefore, a resistance of the anode increased, and the formation efficiency and the capacity retention decreased.

In Comparative Example 3 where the solid content was less than 50 wt % based on the total weight of the anode mixture, the anode binder was not sufficiently combined with the anode active material during the mixing process.

Accordingly, the SEI layer was formed non-uniformly compared to the SEI layers of Examples.

In Comparative Example 4 where the solid content exceeded 80 wt % based on the total weight of the anode mixture, the anode active material and the anode binder were not sufficiently mixed, and the formation of the secondary particle was performed irregularly and partially. Accordingly, the SEI layer was formed non-uniformly compared to the SEI layers of Examples.

What is claimed is:

1. A charged and discharged lithium secondary battery, comprises:
an anode for a lithium secondary battery, a cathode facing the anode and an electrolyte comprising $LiPF_6$,
wherein the anode comprises:
an anode current collector; and
an anode active material layer on at least one surface of the anode current collector, the anode active material layer including an anode active material and an anode binder including a polyacrylic acid-based copolymer,
wherein the anode active material comprises a composite particle that includes a silicon-based active material particle and a solid electrolyte interphase (SEI) layer formed on at least a portion of a surface of the silicon-based active material particle, wherein the SEI layer includes LiF, and
an F-density defined by Equation 1 is from 0% to 23%:

$$F\text{-density (\%)} = (Fc/Fr) * 100 \qquad \text{[Equation 1]}$$

wherein, in Equation 1, $F_C$ is an area of a portion where an F-intensity obtained by scanning a cross-sectional image of the anode active material layer from a scanning electron microscope-energy dispersion X-ray spectroscopy (SEM-EDS) analysis after a formation charging and discharging of the battery with a fluorine (F) element is from 60% to 100%, and
$F_T$ is a total area from which the F element obtained by scanning the cross-sectional image of the anode active material layer from the SEM-EDS analysis after a formation charging and discharging of the battery with the F element is detected, and
a ratio of the number of moles of repeating units derived from a polyacrylic acid to the total number of moles of repeating units included in one molecule of the polyacrylic acid-based copolymer is greater than 0.25 and less than 0.7, wherein the polyacrylic acid-based copolymer includes a polyacrylic acid-polyvinyl alcohol copolymer,
wherein the F-density defined by Equation 1 is measured on a range of 80 μm×50 μm in the cross-section of the anode active material layer, the F-density values is measured through the SEM-EDS analysis with respect to nine different points of the anode active material layer, an average of the F density values is calculated by summing all nine measured F density values and dividing them by 9, three of the nine different points of the anode active material layer is selected at one end portion in a length direction of the anode active material layer, another three of the nine different points of the anode active material layer is selected at the other end portion in the length direction of the anode active material layer, and the other three of the nine different points of the anode active material layer is selected at a central portion in the length direction of the anode active material layer.

2. The charged and discharged lithium secondary battery according to claim 1, wherein the F-density is from 0% to 20% or less.

3. The charged and discharged lithium secondary battery according to claim 1, wherein the silicon-based active material particle includes at least one selected from the group consisting of Si, SiOx (0<x≤2) and a Si-C composite.

4. The charged and discharged lithium secondary battery according to claim 1, wherein the anode active material layer further includes a graphite-based active material particle.

5. The charged and discharged lithium secondary battery according to claim 1, wherein a ratio of the number of moles of repeating units derived from a polyacrylic acid to the total number of moles of repeating units included in one molecule of the polyacrylic acid-based copolymer is in a range from 0.4 to 0.55.

* * * * *